US012511816B2

(12) United States Patent
Chiu et al.

(10) Patent No.: US 12,511,816 B2
(45) Date of Patent: Dec. 30, 2025

(54) IMAGE PROCESSING PLATFORM HAVING AUTOMATICALLY AUTOSTEREOSCOPIC 3D IMAGE GENERATING FUNCTION AND METHOD THEREOF

(71) Applicant: SPEED 3D Inc., Taipei (TW)

(72) Inventors: Li-Chuan Chiu, Taipei (TW); Jui-Chun Chung, Taipei (TW); Yi-Ping Cheng, Taipei (TW)

(73) Assignee: SPEED 3D Inc., Taipei (TW)

( * ) Notice: Subject to any disclaimer, the term of this patent is extended or adjusted under 35 U.S.C. 154(b) by 140 days.

(21) Appl. No.: 18/544,382

(22) Filed: Dec. 18, 2023

(65) Prior Publication Data
US 2025/0148689 A1    May 8, 2025

(30) Foreign Application Priority Data
Nov. 8, 2023    (TW) .................... 112143236

(51) Int. Cl.
*G06T 15/04*    (2011.01)
(52) U.S. Cl.
CPC .................. *G06T 15/04* (2013.01)
(58) Field of Classification Search
CPC ..... A63F 13/428; A63F 13/52; H04N 13/268; H04N 13/383; H04N 13/359; H04N 13/373; H04N 13/275; H04N 13/279; H04N 13/293; G06T 15/04
See application file for complete search history.

(56) References Cited

U.S. PATENT DOCUMENTS

| 12,293,740 B1* | 5/2025 | Chou ............... G09G 3/007 |
| 2016/0021367 A1* | 1/2016 | Yoon ............... G09G 3/03 348/59 |
| 2017/0108702 A1* | 4/2017 | Rabner ............ G02B 30/35 |
| 2018/0068488 A1* | 3/2018 | Hart ............... G06T 19/006 |
| 2019/0339524 A1* | 11/2019 | Wang ............ G02B 27/0172 |
| 2020/0081254 A1* | 3/2020 | Tam ............. G02B 27/0176 |

FOREIGN PATENT DOCUMENTS

| CN | 103426195 A | * 12/2013 | |
| CN | 113516761 A | * 10/2021 | ............ G06T 17/00 |
| CN | 116841350 A | * 10/2023 | ............ G06F 3/0484 |
| JP | 1996262371 A | 10/1996 | |
| JP | 2005031367 A | 2/2005 | |
| JP | 2018185437 A | 11/2018 | |
| TW | M654855 U | 5/2024 | |

* cited by examiner

Primary Examiner — Abderrahim Merouan
(74) Attorney, Agent, or Firm — Bruce Stone LLP; Joseph A. Bruce

(57) ABSTRACT

An image processing platform having automatically autostereoscopic 3D image generating function includes a receiving module and an image converting module. The receiving module receives a target image and an autostereoscopic 3D image information from an external device. The autostereoscopic 3D image information includes a screen number information, a screen size information, a position relation between an optimized viewing position and a screen reference point and a field of view. The image converting module is connected to the receiving module and executes a texture baking process according to the autostereoscopic 3D image information so as to convert the target image into an autostereoscopic 3D image.

8 Claims, 8 Drawing Sheets

S81 — Providing a target image and an autostereoscopic 3D image information by an external device S82 — Receiving the target image and the autostereoscopic 3D image information from the external device by a receiving module, wherein the autostereoscopic 3D image information includes a screen number information, a screen size information, an included angle information between screens, a screen curvature information, a position relation between an optimized viewing position and a screen reference point and a field of view S83 — Executing a texture baking process according to the autostereoscopic 3D image information by an image converting module so as to convert the target image into an autostereoscopic 3D image

IMAGE PROCESSING PLATFORM HAVING AUTOMATICALLY AUTOSTEREOSCOPIC 3D IMAGE GENERATING FUNCTION AND METHOD THEREOF

BACKGROUND OF THE INVENTION

1. Field of the Invention

The present invention relates to an image processing platform, in particular to an image processing platform having automatically autostereoscopic 3D image generating function. The present invention further relates to the automatically autostereoscopic 3D image generating method of the image processing platform.

2. Description of the Prior Art

The autostereoscopic (3D) imaging three-dimension technologies are stereoscopic vision techniques, which allows a viewer to directly perceive 3D images without special stereoscopic glasses. The viewers can comfortably enjoy the 3D visual effects since the viewer do not need to wear the stereoscopic glasses.

However, currently available autostereoscopic 3D imaging technologies are generally applicable to only flat screens, but cannot be directly applied to screens with three-dimensional shapes, such as L-shaped or curved screens. To display autostereoscopic 3D images on screens with three-dimensional shapes, complicated image processing processes are necessary. Additionally, the autostereoscopic 3D images generated by the currently available technologies require customized adjustments for the specific screens and cannot be moved to different locations for use. Consequently, the currently available autostereoscopic 3D imaging technologies are highly inconvenient to use and are significantly restricted in application. As a result, the currently available autostereoscopic 3D imaging technologies cannot meet actual requirements.

SUMMARY OF THE INVENTION

One embodiment of the present invention provides an image processing platform having automatically autostereoscopic three-dimension (3D) image generating function, which includes a receiving module and an image converting module. The receiving module receives a target image and an autostereoscopic 3D image information from an external device. The autostereoscopic 3D image information includes a screen number information, a screen size information, a position relation between an optimized viewing position and a screen reference point and a field of view. The image converting module is connected to the receiving module and executes a texture baking process according to the autostereoscopic 3D image information so as to convert the target image into an autostereoscopic 3D image.

In one embodiment, the autostereoscopic 3D image information further includes an included angle information between screens.

In one embodiment, the autostereoscopic 3D image information further includes a screen curvature information.

In one embodiment, the autostereoscopic 3D image information further includes a setting instruction, which is used to set the size, the format and the frame per second of the autostereoscopic 3D image.

In one embodiment, the position relation includes the distance between the optimized viewing position and the screen reference point, and the included angle between a line connecting the optimized viewing position to the screen reference point and a vertical line passing through the screen reference point.

Another embodiment of the present invention provides an automatically autostereoscopic 3D image generating method, which includes the following steps: providing a target image and an autostereoscopic 3D image information by an external device; receiving the target image and the autostereoscopic 3D image information from the external device by a receiving module, wherein the autostereoscopic 3D image information includes a screen number information, a screen size information, a position relation between an optimized viewing position and a screen reference point and a field of view; and executing a texture baking process according to the autostereoscopic 3D image information by an image converting module so as to convert the target image into an autostereoscopic 3D image.

In one embodiment, the autostereoscopic 3D image information further includes an included angle information between screens.

In one embodiment, the autostereoscopic 3D image information further includes a screen curvature information.

In one embodiment, the autostereoscopic 3D image information further includes a setting instruction, which is used to set the size, the format and the frame per second of the autostereoscopic 3D image.

In one embodiment, the position relation includes the distance between the optimized viewing position and the screen reference point, and the included angle between a line connecting the optimized viewing position to the screen reference point and a vertical line passing through the screen reference point.

The image processing platform having automatically autostereoscopic 3D image generating function in accordance with the embodiments of the present invention may have the following advantages:

(1) In one embodiment of the present invention, the image processing platform includes a receiving module and an image converting module. The receiving module receives a target image and an autostereoscopic 3D image information from an external device. The autostereoscopic 3D image information includes a screen number information, a screen size information, an included angle information between screens, a screen curvature information, a position relation between an optimized viewing position and a screen reference point, and a field of view. The image converting module is connected to the receiving module and performs a texture baking process based on the autostereoscopic 3D image information in order to convert the target image into an autostereoscopic 3D image. Via this automatically autostereoscopic 3D image generating mechanism, the user can select the target image via the external device, such as a smartphone, a tablet computer, and a laptop computer, and edit the autostereoscopic 3D image information based on the characteristics of a target screen. Consequently, the image converting module can convert the target image into the autostereoscopic 3D image that match the target screen. In this way, the user can quickly generate the desired autostereoscopic 3D image via the image processing platform, which significantly reduces the cost of producing autostereoscopic 3D images. Therefore, the image processing platform is highly convenient to use and comprehensive in application.

(2) In one embodiment of the present invention, the image processing platform can provide the automatically autostereoscopic 3D image generating mechanism and the user can select the target image via the external device to edit the autostereoscopic 3D image information based on the characteristics of the target screen. Hence, if a change in the optimized viewing position is needed, the user can directly edit the autostereoscopic 3D image information to input the updated the position relation between the optimized viewing position and the screen reference point so as to generate autostereoscopic 3D image. Accordingly, the image processing platform can meet various application requirements.

(3) In one embodiment of the present invention, the image processing platform provides the automatically autostereoscopic 3D image generating mechanism. The autostereoscopic 3D images generated by the above mechanism can be applied not only to L-shaped screens but also to curved screens or various other types of screens. Therefore, the image processing platform can be more flexible in use and satisfy the needs of different users.

(4) In one embodiment of the present invention, the image processing platform provides the automatically autostereoscopic 3D image generating mechanism. The autostereoscopic 3D images generated by the above mechanism can be referenced by visual designers. This convenience allows visual designers to more efficiently optimize the overall visual effect of the autostereoscopic 3D image displayed on target screen.

(5) In one embodiment of the present invention, the image processing platform provides the automatically autostereoscopic 3D image generating mechanism. Thus, the user can quickly produce the desired autostereoscopic 3D images without the need for complicated image processing processes. Consequently, the image processing platform can effectively meet various practical application needs.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
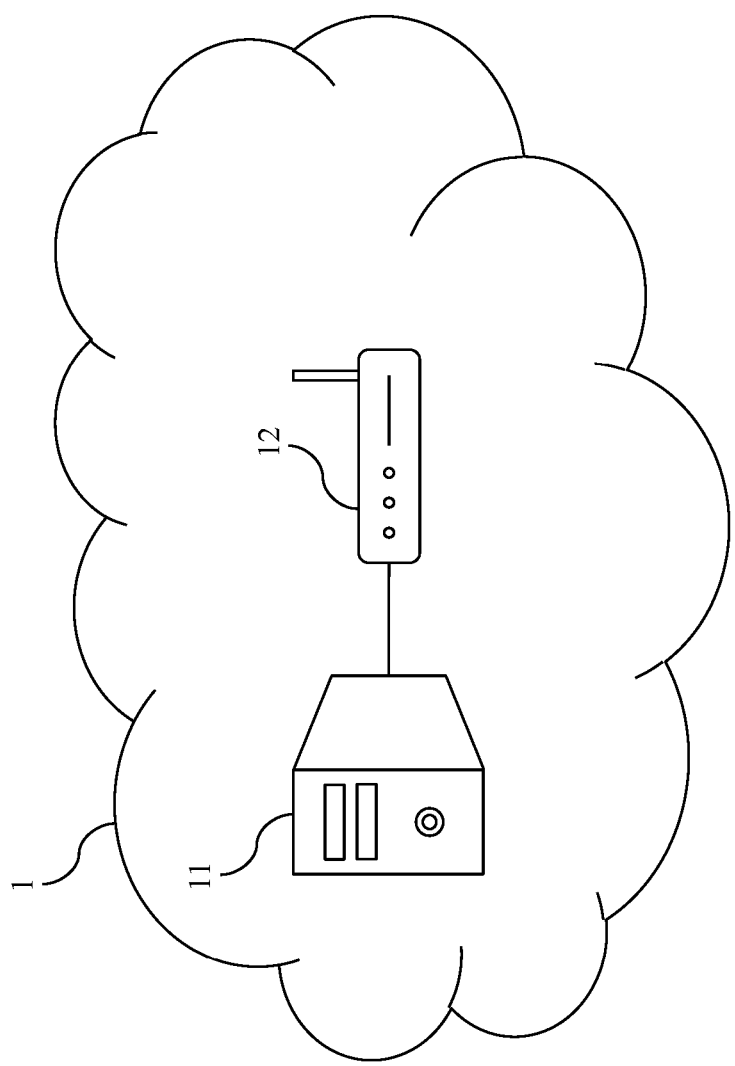
FIG. 1 is the schematic view of the image processing platform having automatically autostereoscopic 3D image generating function in accordance with the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the schematic view of the image processing platform having automatically autostereoscopic three-dimension (3D) image generating function in accordance with the first embodiment of the present invention. As shown in FIG. 1, the image processing platform 1 includes a receiving module 12 and an image converting module 11. The receiving module 12 is connected to the image converting module 11. In one embodiment, the image processing platform 1 can be a cloud platform providing online services. In another embodiment, the image processing platform 1 can be an offline image processing device providing offline services. In one embodiment, the image converting module 11 can be a server, workstation, or other computer device with image processing capabilities. In one embodiment, the receiving module 12 can be an antenna module or other communication devices with communication functions. In another embodiment, the receiving module 12 and the image converting module 11 can be integrated into a single device.

The embodiment just exemplifies the present invention and is not intended to limit the scope of the present invention; any equivalent modification and variation according to the spirit of the present invention is to be also included within the scope of the following claims and their equivalents.

Figure 2:
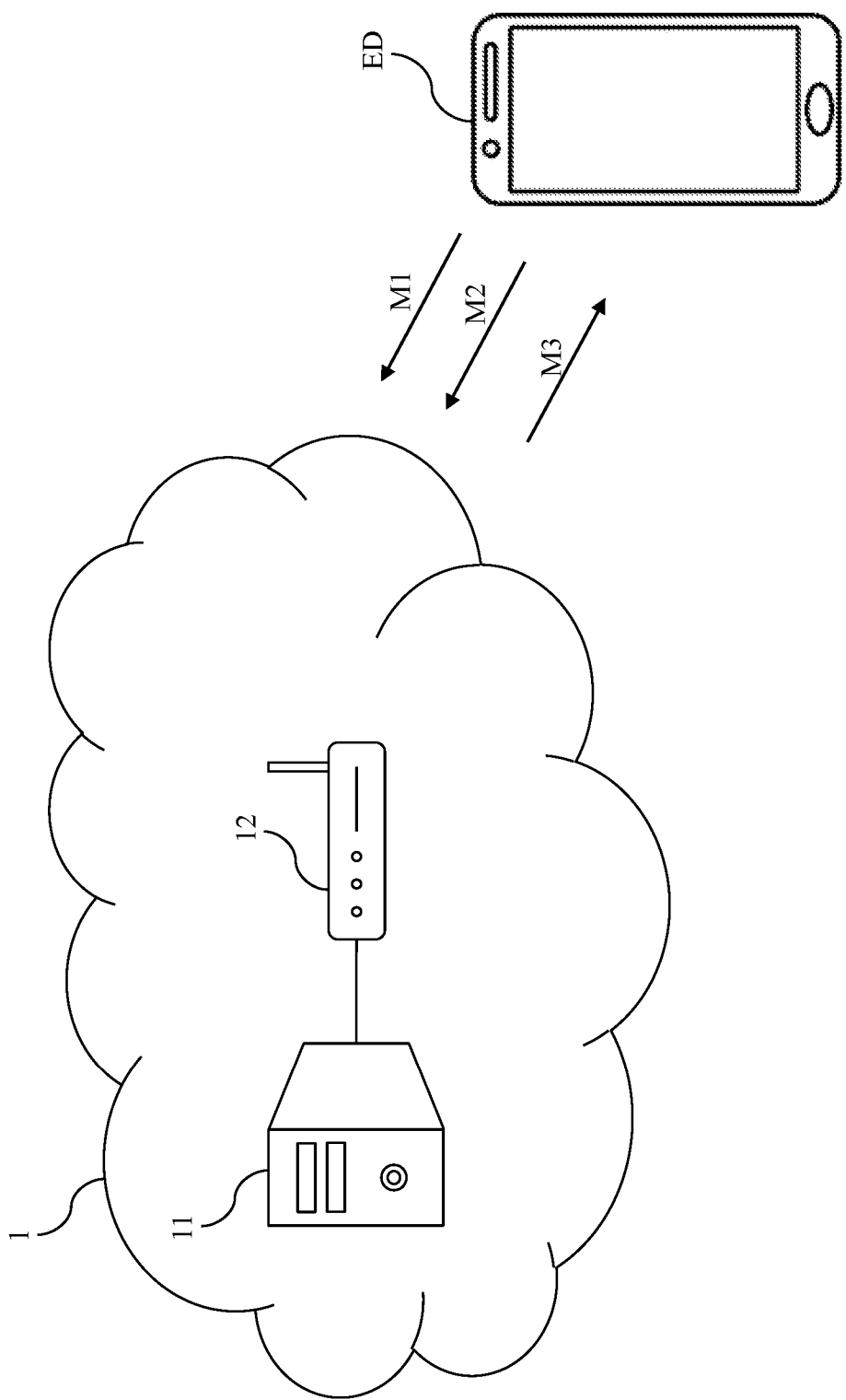
FIG. 2 is the schematic view of the operating state of the image processing platform having automatically autostereoscopic 3D image generating function in accordance with the first embodiment of the present invention.

Please refer to FIG. 2, which is the schematic view of the operating state of the image processing platform having automatically autostereoscopic 3D image generating function in accordance with the first embodiment of the present invention. As shown in FIG. 2, the receiving module 12 receives a target image M1 and an autostereoscopic 3D image information M2 from an external device ED. The user can choose one of multiple images as the target image M1 through the application executed on the external device ED and edit the autostereoscopic 3D image information M2. Subsequently, the user can transmit the target image M1 and the autostereoscopic 3D image information M2 to the image converting module 11 through the external device ED. In this embodiment, if the user chooses an L-shaped target screen, the autostereoscopic 3D image information M2 may include a screen number information, a screen size information, an included angle information between screens, a position relation between an optimized viewing position and a screen reference point, a field of view (FOV), and a setting instruction. In another embodiment, if the user selects a curved target screen, the autostereoscopic 3D image information M2 may include a screen number information, a screen size information, an included angle information between screens and/or a screen curvature information, a position relation between an optimized viewing position and a screen reference point, a field of view (FOV), and a setting instruction.

Subsequently, the image converting module 11 can execute a texture baking process based on the autostereoscopic 3D image information M2 to convert the target into image M1 an autostereoscopic 3D image M3 (the autostereoscopic 3D image M3 described in this specification refers to a two-dimensional image with three-dimensional visual effects). First, the image converting module 11 can generate a 3D simulation space simulating the target screen based on the autostereoscopic 3D image information M2. Then, the target image M1 is projected onto the simulated target screen from the optimized viewing point within the 3D simulation space, and the texture baking process is executed. Through this mechanism, the image converting module 11 can generate the autostereoscopic 3D image M3 that matches the real target screen. Finally, the user can download the autostereoscopic 3D image M3 through the external device ED and play the autostereoscopic 3D image M3 on the target screen.

The embodiment just exemplifies the present invention and is not intended to limit the scope of the present invention; any equivalent modification and variation according to the spirit of the present invention is to be also included within the scope of the following claims and their equivalents.

Figure 3:
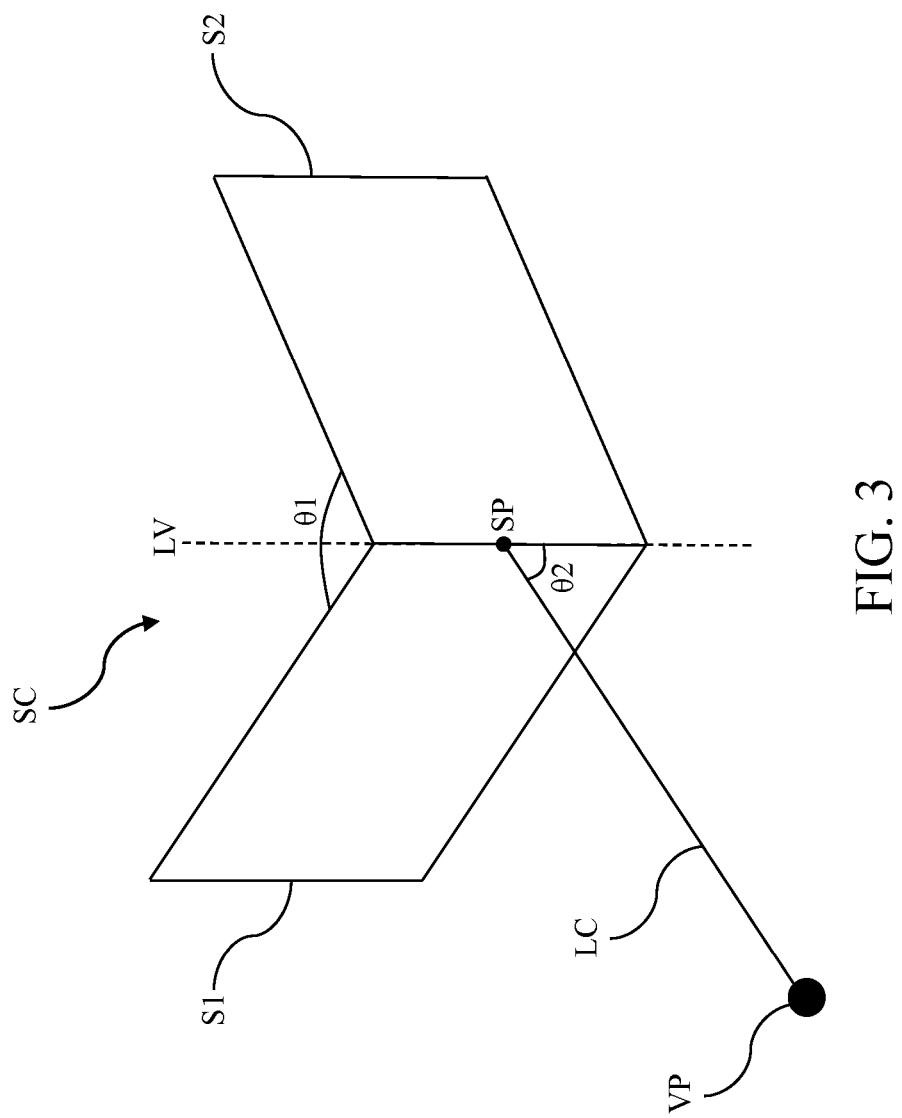
FIG. 3 is the first schematic view of the target screen of the image processing platform having automatically autostereoscopic 3D image generating function in accordance with the first embodiment of the present invention.

Please refer to FIG. 3, which is the first schematic view of the target screen of the image processing platform having automatically autostereoscopic 3D image generating function in accordance with the first embodiment of the present invention. As shown in FIG. 3, the target screen SC is an L-shaped screen, which includes a first plane screen S1 and a second plane screen S2 connected to each other. Therefore, the user can edit the autostereoscopic 3D image information M2 based on the characteristics of the target screen SC. The screen number information can be set to 2, the screen size information can be set to 1 m*1.5 m, the included angle information between screens can be set as θ1, and an appropriate field of view can be configured. Additionally, the user needs to edit the position relation between the optimized viewing position VP and the screen reference point SP, and the setting instruction. Regarding the position relation, the user can set the distance between the optimized viewing position VP and the screen reference point SP, and the included angle θ2 between the line LC connecting the optimized viewing position VP to the screen reference point SP and the vertical line LV passing through the screen reference point SP. Regarding the setting instruction, the user can set the size, format, and frames per second (FPS) of the autostereoscopic 3D image M3 via the setting instruction. In this embodiment, the screen reference point SP can be the center point of the connection portion (a straight line) of the first plane screen S1 and the second plane screen S2. In another embodiment, the screen reference point SP can be above or below the center point mentioned above. In still another embodiment, the screen reference point SP can be the center point of the first plane screen S1 or the second plane screen S2, depending on the actual requirements. The user can adjust the optimized viewing position VP according to actual requirements.

Figure 4:
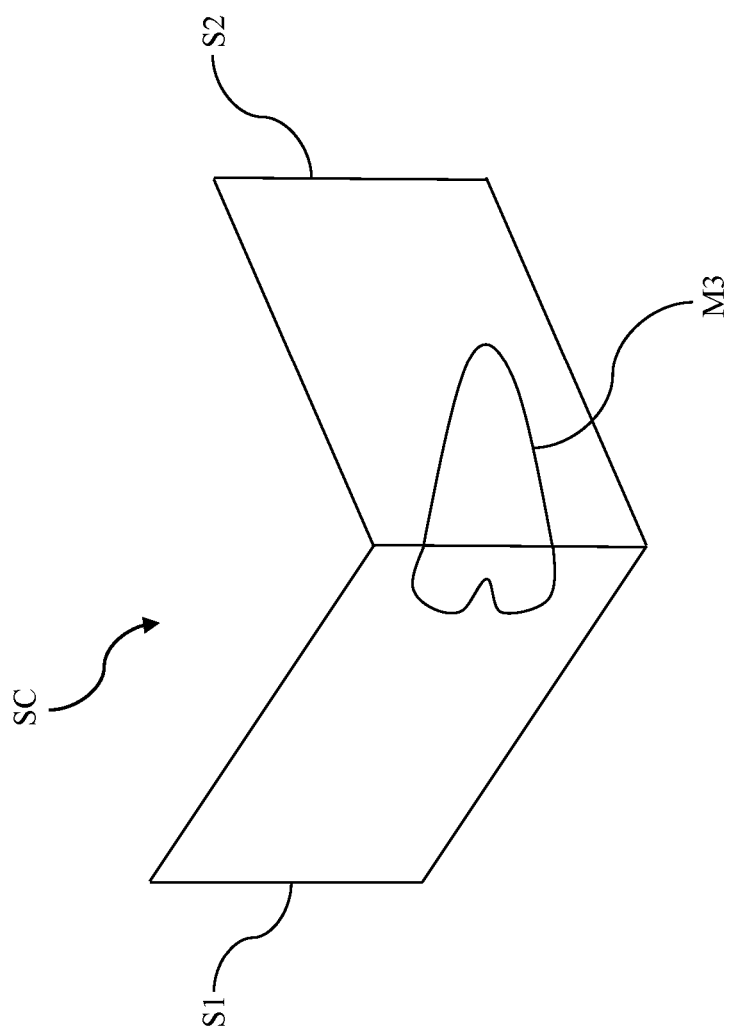
FIG. 4 is the second schematic view of the target screen of the image processing platform having automatically autostereoscopic 3D image generating function in accordance with the first embodiment of the present invention.

Please refer to FIG. 4, which is the second schematic view of the target screen of the image processing platform having automatically autostereoscopic 3D image generating function in accordance with the first embodiment of the present invention. As shown in FIG. 4, through the aforementioned automatically autostereoscopic 3D image generating mechanism, the image converting module 11 can generate the autostereoscopic 3D image M3 that matches the target screen SC so as to make sure that the autostereoscopic 3D image M3 does not be distorted or have other defects.

Figure 5:
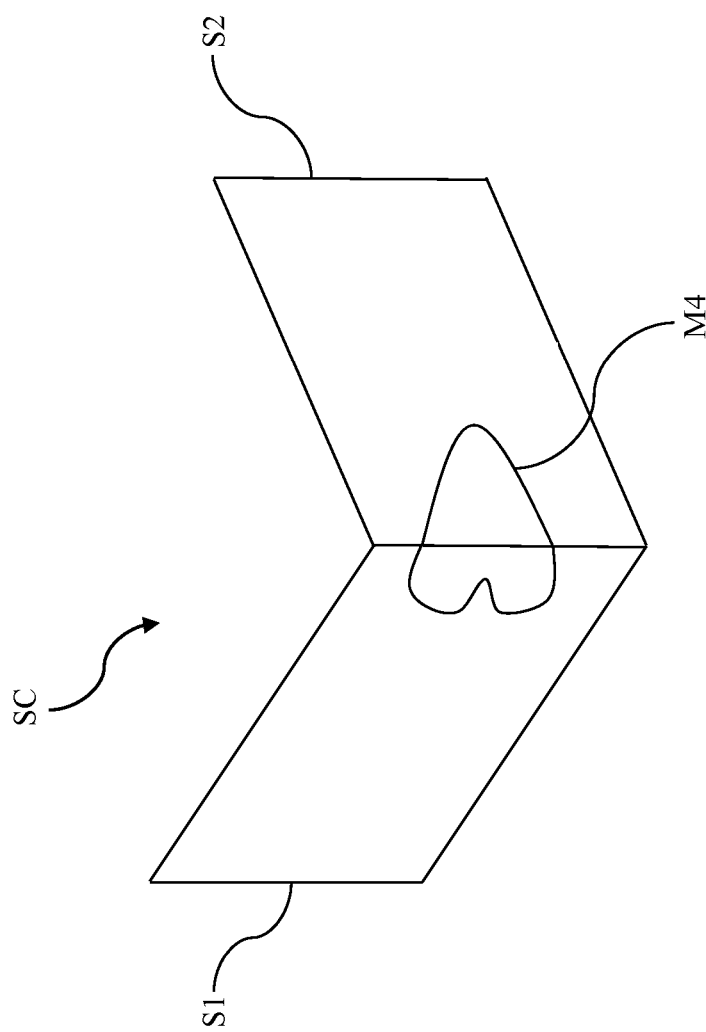
FIG. 5 is the third schematic view of the target screen of the image processing platform having automatically autostereoscopic 3D image generating function in accordance with the first embodiment of the present invention.

Please refer to FIG. 5, which is the third schematic view of the target screen of the image processing platform having automatically autostereoscopic 3D image generating function in accordance with the first embodiment of the present invention. As shown in FIG. 5, without the aforementioned automatically autostereoscopic 3D image generating mechanism, the image M4 displayed on the target screen SC would be distorted or have other defects.

Through the aforementioned automatically autostereoscopic 3D image generating mechanism, the user can select the target image SC via the external device ED and edit the autostereoscopic 3D image information M2 based on the characteristics of the target screen SC. In this way, the image converting module 11 can convert the target image M1 into the autostereoscopic 3D image M3 that matches the target screen SC. Therefore, the user can quickly generate the required autostereoscopic 3D image M3 through the image processing platform 1, which significantly reduces the cost of producing the autostereoscopic 3D image M3. Therefore, the image processing platform 1 is convenient in use and comprehensive in application.

Moreover, if there is a need to change the optimized viewing position, the user can directly edit the autostereoscopic 3D image information M2 to input the position relation between the updated optimized viewing position VP and screen reference point SP so as to generate the autostereoscopic 3D image M3. Therefore, the image processing platform 1 can meet the requirements of different applications. The aforementioned autostereoscopic 3D image M3 can be referenced by a visual designer, so the visual designer can conveniently conduct visual design so as to more efficiently optimize the overall visual effect of the autostereoscopic 3D image M2 displayed on the target screen SC.

The embodiment just exemplifies the present invention and is not intended to limit the scope of the present invention; any equivalent modification and variation according to the spirit of the present invention is to be also included within the scope of the following claims and their equivalents.

Figure 6:
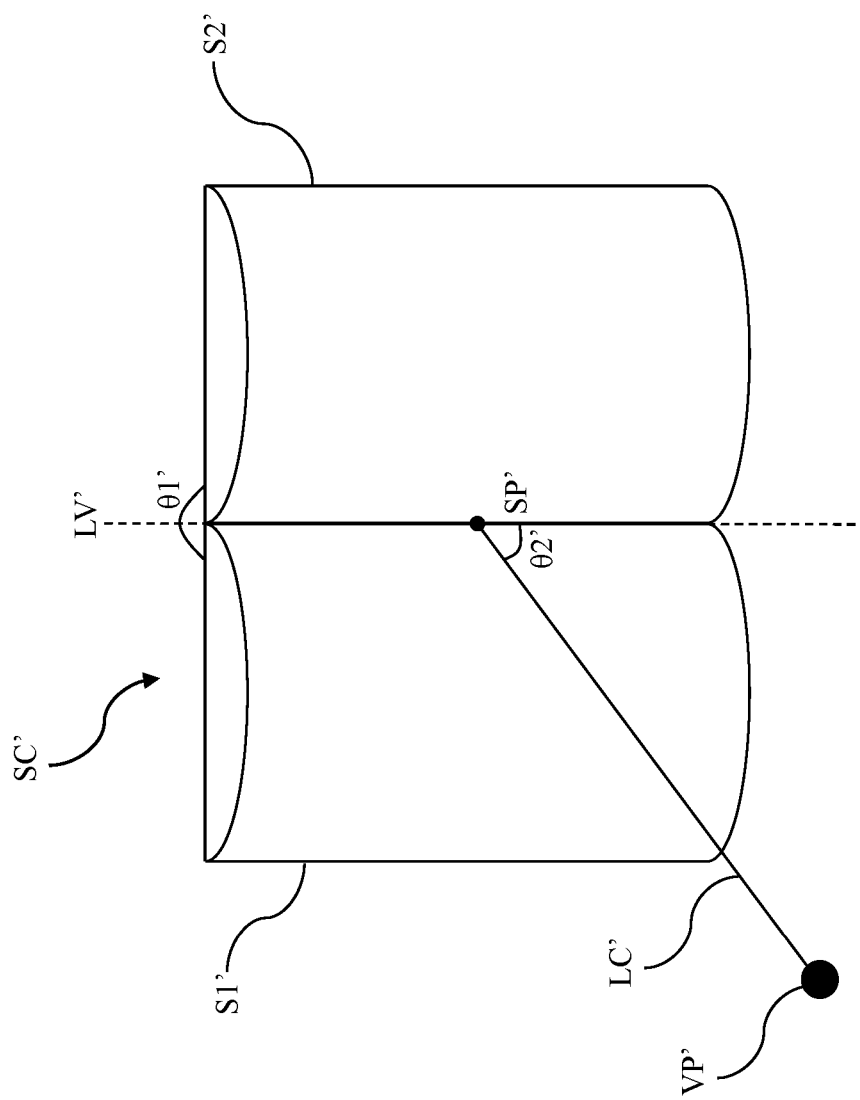
FIG. 6 is the schematic view of the target screen of the image processing platform having automatically autostereoscopic 3D image generating function in accordance with the second embodiment of the present invention.

Please refer to FIG. 6, which is the schematic view of the target screen of the image processing platform having automatically autostereoscopic 3D image generating function in accordance with the second embodiment of the present invention. As shown in FIG. 6, the target screen SC' is a curved screen, which includes a first curved screen S1' and a second curved screen S2' connected to each other. Therefore, the user can edit the autostereoscopic 3D image information M2 based on the characteristics of the target screen SC'. The screen number information can be set to 2, the screen size information can be set to 1 m*0.5 m, the included angle information between screens can be set as θ1', and an appropriate field of view can be configured. Additionally, the user can increase the setting of the screen curvature information (which can be expressed in radians). Regarding the position relation mentioned above, the user can set the distance between the optimized viewing position VP' and the screen reference point SP', and the angle θ2' between the line LC' connecting the optimized viewing position VP' to the screen reference point SP', and the vertical line LV' passing through the screen reference point SP'. Similarly, the screen reference point SP' can be the center point of the connection portion (a straight line) of the first curved screen S1' and the second curved screen S2'. The user can adjust the optimized viewing position VP' according to the actual requirements. Similarly, the user can set the size, format, and frames per second (FPS) of the autostereoscopic 3D image M3 via the setting instruction.

Currently available autostereoscopic 3D images are customized for specific screens and cannot be applied to other screens or different locations directly. In contrast, as previously stated, through the automatically autostereoscopic 3D image generating mechanism, the user only needs to select a target image via an external device (such as a smartphone, tablet computer, laptop computer, etc.) and edit the autostereoscopic 3D image information M2 based on the characteristics of the target screen. Then, the image converting module 11 can convert the target image into the autostereoscopic 3D image M3 that matches the target screen. Therefore, the user can adjust the autostereoscopic 3D image information M2 via the mechanism mentioned above in order to generate autostereoscopic 3D image M3 suitable for different target screens and locations. As a result, the automatically autostereoscopic 3D image generating mechanism can effectively improve the shortcomings of prior art.

The embodiment just exemplifies the present invention and is not intended to limit the scope of the present invention; any equivalent modification and variation according to the spirit of the present invention is to be also included within the scope of the following claims and their equivalents.

It is worthy to point out that currently available autostereoscopic 3D imaging technologies are generally applicable to only flat screens, but cannot be directly applied to screens with three-dimensional shapes, such as L-shaped or curved screens. To display autostereoscopic 3D images on screens with three-dimensional shapes, complicated image processing processes are necessary. Consequently, the currently available autostereoscopic 3D imaging technologies are highly inconvenient to use and are significantly restricted in application. As a result, the currently available autostereoscopic 3D imaging technologies cannot meet actual requirements. By contrast, according to one embodiment of the present invention, the image processing platform includes a receiving module and an image converting module. The receiving module receives a target image and an autostereoscopic 3D image information from an external device. The autostereoscopic 3D image information includes a screen number information, a screen size information, an included angle information between screens, a screen curvature information, a position relation between an optimized viewing position and a screen reference point, and a field of view. The image converting module is connected to the receiving module and performs a texture baking process based on the autostereoscopic 3D image information in order to convert the target image into an autostereoscopic 3D image. Via this automatically autostereoscopic 3D image generating mechanism, the user can select the target image via the external device, such as a smartphone, a tablet computer, and a laptop computer, and edit the autostereoscopic 3D image information based on the characteristics of a target screen. Consequently, the image converting module can convert the target image into the autostereoscopic 3D image that match the target screen. In this way, the user can quickly generate the desired autostereoscopic 3D image via the image processing platform, which significantly reduces the cost of producing autostereoscopic 3D images. Therefore, the image processing platform is highly convenient to use and comprehensive in application.

Also, according to one embodiment of the present invention, the image processing platform can provide the automatically autostereoscopic 3D image generating mechanism and the user can select the target image via the external device to edit the autostereoscopic 3D image information based on the characteristics of the target screen. Hence, if a change in the optimized viewing position is needed, the user can directly edit the autostereoscopic 3D image information to input the updated the position relation between the optimized viewing position and the screen reference point so as to generate autostereoscopic 3D image. Accordingly, the image processing platform can meet various application requirements.

Further, according to one embodiment of the present invention, the image processing platform provides the automatically autostereoscopic 3D image generating mechanism. The autostereoscopic 3D images generated by the above mechanism can be applied not only to L-shaped screens but also to curved screens or various other types of screens. Therefore, the image processing platform can be more flexible in use and satisfy the needs of different users.

Moreover, according to one embodiment of the present invention, the image processing platform provides the automatically autostereoscopic 3D image generating mechanism. The autostereoscopic 3D images generated by the above mechanism can be referenced by visual designers. This convenience allows visual designers to more efficiently optimize the overall visual effect of the autostereoscopic 3D image displayed on target screen.

Furthermore, according to one embodiment of the present invention, the image processing platform provides the automatically autostereoscopic 3D image generating mechanism. Thus, the user can quickly produce the desired autostereoscopic 3D images without the need for complicated image processing processes. Consequently, the image processing platform can effectively meet various practical application needs. As set forth above, the image processing platform having automatically autostereoscopic 3D image generating function according to the embodiments can definitely achieve great technical effects.

Figure 7:
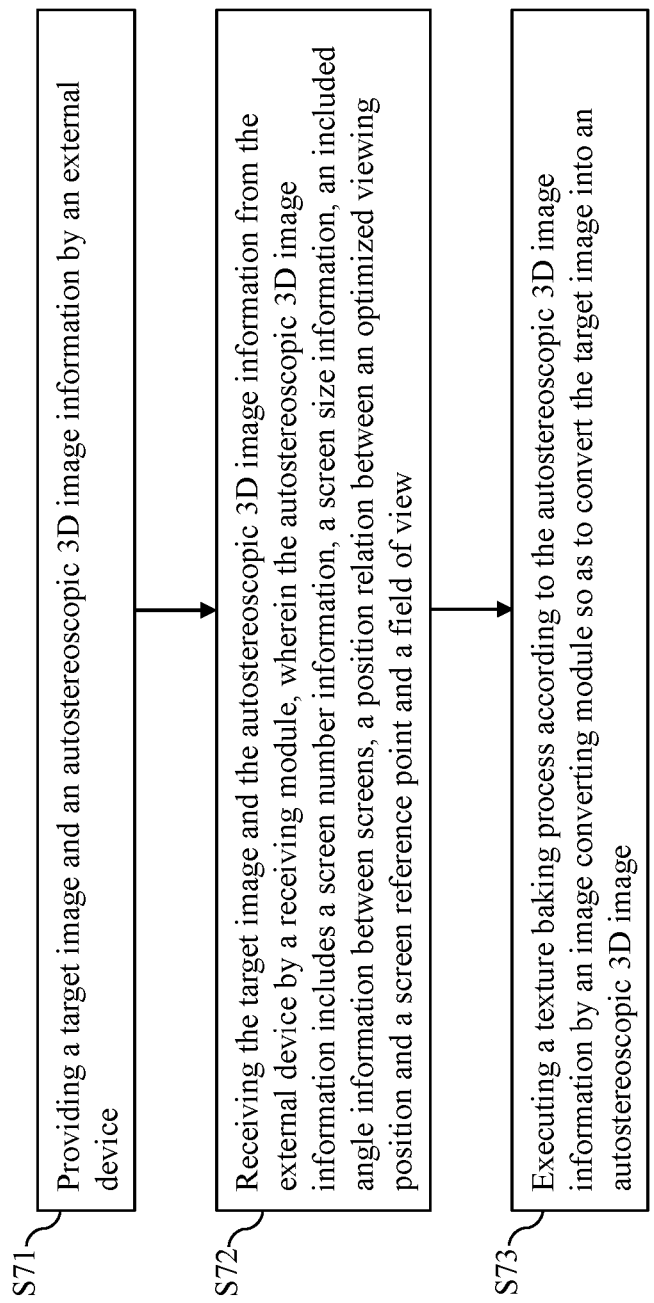
FIG. 7 is the flow chart of the automatically autostereoscopic 3D image generating method in accordance with the third embodiment of the present invention.

Please refer to FIG. 7, which is the flow chart of the automatically autostereoscopic 3D image generating method in accordance with the third embodiment of the present invention. As shown in FIG. 7, the automatically autostereoscopic 3D image generating method of the embodiment includes the following steps:

Step S71: providing a target image and an autostereoscopic 3D image information by an external device.

Step S72: receiving the target image and the autostereoscopic 3D image information from the external device by a receiving module, wherein the autostereoscopic 3D image information includes a screen number information, a screen size information, an included angle information between screens, a position relation between an optimized viewing position and a screen reference point and a field of view.

Step S73: executing a texture baking process according to the autostereoscopic 3D image information by an image converting module so as to convert the target image into an autostereoscopic 3D image.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Figure 8:
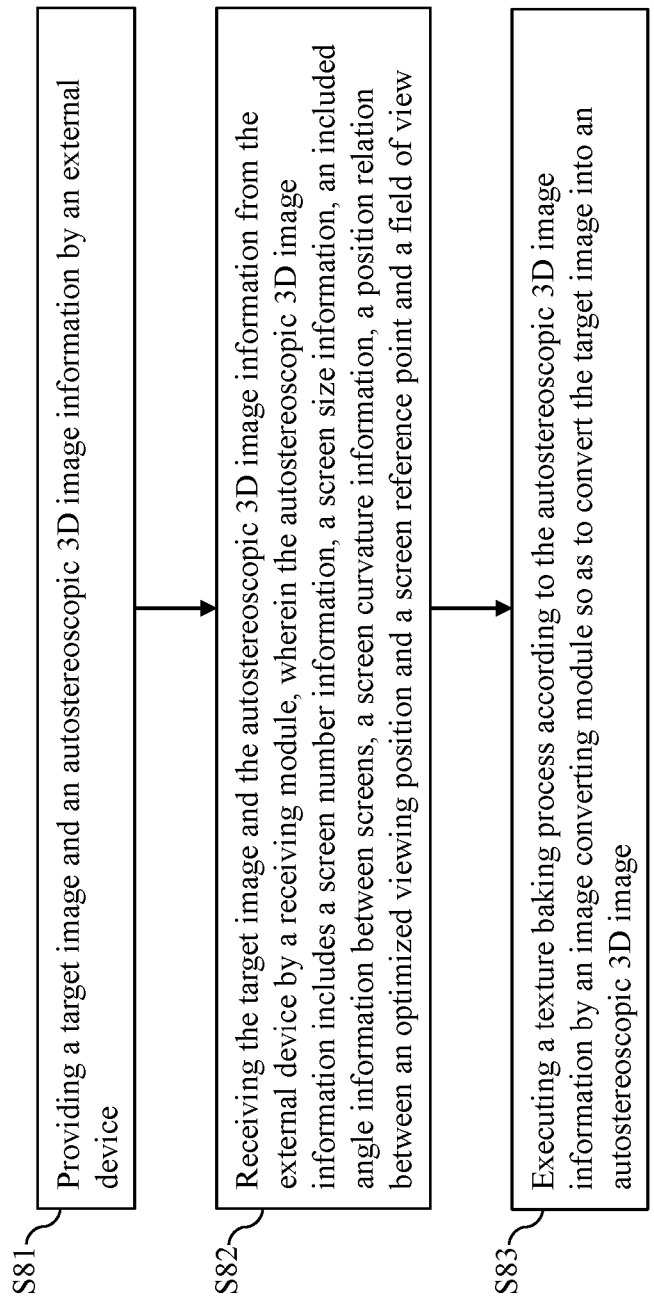
FIG. 8 is the flow chart of the automatically autostereoscopic 3D image generating method in accordance with the fourth embodiment of the present invention.

Please refer to FIG. 8, which is the flow chart of the automatically autostereoscopic 3D image generating method in accordance with the fourth embodiment of the present invention. As shown in FIG. 8, the automatically autostereoscopic 3D image generating method of the embodiment includes the following steps:

Step S81: providing a target image and an autostereoscopic 3D image information by an external device.

Step S82: receiving the target image and the autostereoscopic 3D image information from the external device by a receiving module, wherein the autostereoscopic 3D image information includes a screen number information, a screen size information, an included angle information between screens, a screen curvature information, a position relation between an optimized viewing position and a screen reference point and a field of view.

Step S83: executing a texture baking process according to the autostereoscopic 3D image information by an image converting module so as to convert the target image into an autostereoscopic 3D image.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the image processing platform includes a receiving module and an image converting module. The receiving module receives a target image and an autostereoscopic 3D image information from an external device. The autostereoscopic 3D image information includes a screen number information, a screen size information, an included angle information between screens, a screen curvature information, a position relation between an optimized viewing position and a screen reference point, and a field of view. The image converting module is connected to the receiving module and performs a texture baking process based on the autostereoscopic 3D image information in order to convert the target image into an autostereoscopic 3D image. Via this automatically autostereoscopic 3D image generating mechanism, the user can select the target image via the external device, such as a smartphone, a tablet computer, and a laptop computer, and edit the autostereoscopic 3D image information based on the characteristics of a target screen. Consequently, the image converting module can convert the target image into the autostereoscopic 3D image that match the target screen. In this way, the user can quickly generate the desired autostereoscopic 3D image via the image processing platform, which significantly reduces the cost of producing autostereoscopic 3D images. Therefore, the image processing platform is highly convenient to use and comprehensive in application.

Also, according to one embodiment of the present invention, the image processing platform can provide the automatically autostereoscopic 3D image generating mechanism and the user can select the target image via the external device to edit the autostereoscopic 3D image information based on the characteristics of the target screen. Hence, if a change in the optimized viewing position is needed, the user can directly edit the autostereoscopic 3D image information to input the updated the position relation between the optimized viewing position and the screen reference point so as to generate autostereoscopic 3D image. Accordingly, the image processing platform can meet various application requirements.

Further, according to one embodiment of the present invention, the image processing platform provides the automatically autostereoscopic 3D image generating mechanism. The autostereoscopic 3D images generated by the above mechanism can be applied not only to L-shaped screens but also to curved screens or various other types of screens. Therefore, the image processing platform can be more flexible in use and satisfy the needs of different users.

Moreover, according to one embodiment of the present invention, the image processing platform provides the automatically autostereoscopic 3D image generating mechanism. The autostereoscopic 3D images generated by the above mechanism can be referenced by visual designers. This convenience allows visual designers to more efficiently optimize the overall visual effect of the autostereoscopic 3D image displayed on target screen.

Furthermore, according to one embodiment of the present invention, the image processing platform provides the automatically autostereoscopic 3D image generating mechanism. Thus, the user can quickly produce the desired autostereoscopic 3D images without the need for complicated image processing processes. Consequently, the image processing platform can effectively meet various practical application needs.

It should also be noted that at least some of the operations for the methods described herein may be implemented using software instructions stored on a computer useable storage medium for execution by a computer (or a processor). As an example, an embodiment of a computer program product includes a computer useable storage medium to store a computer readable program.

The computer useable or computer readable storage medium can be an electronic, magnetic, optical, electromagnetic, infrared, or semiconductor system (or apparatus or device). Examples of non-transitory computer useable and computer readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing platform having automatically autostereoscopic three-dimension (3D) image generating function, comprising:
    a receiving module configured to receive a target image and an autostereoscopic 3D image information from an external device, wherein the autostereoscopic 3D image information comprises a screen number information, a screen size information, a position relation between an optimized viewing position and a screen reference point and a field of view, wherein the position relation comprises a distance between the optimized viewing position and the screen reference point, and an included angle between a line connecting the optimized viewing position to the screen reference point and a vertical line passing through the screen reference point, wherein when a target screen comprises a first screen and a second screen connected to each other, the screen number information is 2, and the screen reference point is a center point of a connection portion of the first screen and the second screen, wherein the first screen and the second screen are plane screens or curved screens; and
    an image converting module connected to the receiving module and configured to execute a texture baking process according to the autostereoscopic 3D image information so as to convert the target image into an autostereoscopic 3D image.

2. The image processing platform having automatically autostereoscopic 3D image generating function as claimed in claim 1, wherein the autostereoscopic 3D image information further comprises an included angle information between screens.

3. The image processing platform having automatically autostereoscopic 3D image generating function as claimed in claim 1, wherein the autostereoscopic 3D image information further comprises a screen curvature information.

4. The image processing platform having automatically autostereoscopic 3D image generating function as claimed in claim 1, wherein the autostereoscopic 3D image information further comprises a setting instruction configured to set a size, a format and a frame per second of the autostereoscopic 3D image.

5. An automatically autostereoscopic 3D image generating method, comprising:
    providing a target image and an autostereoscopic 3D image information by an external device;
    receiving the target image and the autostereoscopic 3D image information from the external device by a receiving module, wherein the autostereoscopic 3D image information comprises a screen number information, a screen size information, a position relation between an optimized viewing position and a screen reference point and a field of view, wherein the position relation comprises a distance between the optimized viewing position and the screen reference point, and an included angle between a line connecting the optimized viewing position to the screen reference point and a vertical line passing through the screen reference point, wherein when a target screen comprises a first screen and a second screen connected to each other, the screen number information is 2, and the screen reference point is a center point of a connection portion of the first screen and the second screen, wherein the first screen and the second screen are plane screens or curved screens; and
    executing a texture baking process according to the autostereoscopic 3D image information by an image converting module so as to convert the target image into an autostereoscopic 3D image.

6. The automatically autostereoscopic 3D image generating method as claimed in claim 5, wherein the autostereoscopic 3D image information further comprises an included angle information between screens.

7. The automatically autostereoscopic 3D image generating method as claimed in claim 5, wherein the autostereoscopic 3D image information further comprises a screen curvature information.

8. The automatically autostereoscopic 3D image generating method as claimed in claim 5, wherein the autostereoscopic 3D image information further comprises a setting instruction configured to set a size, a format and a frame per second of the autostereoscopic 3D image.

* * * * *